United States Patent [19]

Bouchet et al.

[11] 3,786,431

[45] Jan. 15, 1974

[54] ELECTRONIC SCANNER CHECKING PROCESS AND SYSTEM

[75] Inventors: Claude Bouchet, La Verenne-St.-Hilarie; Vittorio Ziliotto, Versailles, both of France

[73] Assignee: International Standard Electric Corporation, New York, N.Y.

[22] Filed: Mar. 6, 1972

[21] Appl. No.: 232,098

[30] Foreign Application Priority Data

Mar. 5, 1971 France ................................ 71.7696

[52] U.S. Cl. .............................................. 340/172.5

[51] Int. Cl. .............................................. G06f 11/00

[58] Field of Search ................................ 340/172.5; 235/153 AC, 153 AK

[56] References Cited

UNITED STATES PATENTS

| | | | |
|---|---|---|---|
| 3,646,519 | 2/1972 | Wollum et al. | 235/153 AC |
| 3,544,777 | 12/1970 | Winkler | 235/152 AK |
| 3,492,645 | 1/1970 | Aridas | 235/153 AK |

*Primary Examiner*—Gareth D. Shaw
*Attorney*—C. Cornell Remsen, Jr. et al.

[57] ABSTRACT

An electronic scanner is started by a central processor to asynchronously scan a number of lines. When the scanner detects a calling line, it stops and calls the processor. The processor then starts the scanner again to operate till it detects another calling line or reaches the last line to be scanned. It is possible with such a system that the scanner will not operate properly and the central processor will not be informed of this fact. The invention provides for check scanning, without event detection, but with a stop at specified addresses.

5 Claims, 3 Drawing Figures

PRIOR ART SIGNALS

ELECTRONIC SCANNER CHECKING PROCESS AND SYSTEM

BACKGROUND OF THE INVENTION

1. Field of the Invention

The present invention relates to a scanner checking process and system and, more particularly, to a checking process and system which may be used in an asynchronous scanner.

2. Description of the Prior Art

An asynchronous scanner is a scanner whose operation is periodically started by a central unit and which then scans step by step units or groups of units in order to obtain from these units data or scanning results. The scanner analyzes these scanning results and, when the results have certain determined values, it stops the scanning and calls the central unit, in order to inform it of the contents of the obtained results. Then the scanning recommences, generally at the stop-point and goes on until all the units have been scanned.

Such scanners can be found in central control switching systems or analogous systems. They enable the central unit to collect data given by a great number of units, lines or circuits. As an indication, a scanner of this type is described in the French Patent application No. 71,04237 filed on Feb. 9, 1971 by the applicants of the present invention, assigned to Compagnie Generale de Constructions Telephoniques and Le Material Telephonique and entitled "Telephone exchange subscribers' line scanner." An application corresponding to this French application was filed in the United States on Jan. 26, 1972 and accorded Ser. No. 220,986.

The advantage of an asynchronous scanner is to relieve the central unit of certain simple but repetitive tasks. Thus, for collecting data, the central unit only intervenes once to start the scanning and again each time the scanner has found significant results. A drawback of this scanning mode is that the central unit, after having given a scanning order or instruction, has no way of knowing whether the scanner has correctly carried out its work.

SUMMARY OF THE INVENTION

An object of the present invention is therefore to provide a checking process and system which enables the central unit to assure that the scanner operates correctly.

The asynchronous scanner, in order to scan step by step units or groups of units, generally includes a clock and scanning counter. The greatest risk is a failure of these circuits resulting in an incomplete scanning or no scanning at all.

The invention therefore makes it possible in particular to check the good operation of the circuits, clock and counter, which regulate the scanning in an asynchronous counter.

According to the inventive process, the central unit periodically gives the scanner a check order and the scanner, in response to said order, undertakes a step by step scanning. When the scanner reaches certain predetermined scanning steps, it stops the scanning and calls the central unit. The central unit will thus be informed that the scanning carried out in response to the check order progresses. It will be advantageously provided that during this check scanning, the scanner takes no account of the scanning results obtained, in order to call the central unit only when the predetermined scanning steps are reached, which will simplify the check operations in the central unit.

In order to apply this process, the invention provides a checking system comprising, in the scanner, means for registering a check order given by the central unit, means responding to this check order for starting the scanning, and means for identifying certain predetermined scanning steps and for generating a stop signal, which stops the scanning and results in calling the central unit.

BRIEF DESCRIPTION OF THE DRAWINGS

Various other features will be disclosed from the following description, given by way of non-limited example and with reference to the accompanying drawings, in which.

FURTHER DESCRIPTION OF THE PRIOR ART

First will be described, referring to FIG. 1, the block diagram of a well-known asynchronous scanner.

This scanner includes scanning circuits CE and control circuits CC communicating with a central unit UC. In the control circuits CC, there is found an address register RO which, with the incrementation circuit IN, constitutes the scanning counter. The control circuits also include a result register R1, an analysis device REV and various OR gates (circle containing a cross, sign of logic inclusion) and AND gates (circle containing a dot, sign of logic intersection). In the scanning circuits CE, are found selection circuits CS, a scanning matrix ME and read circuits ER. The units to be scanned, not represented, are associated with the scanning matrix ME.

Figure 2:
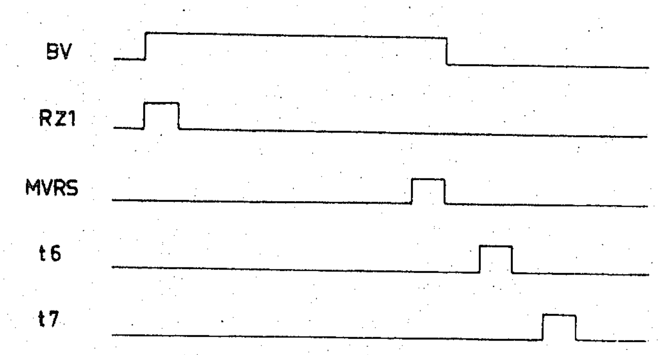
PRIOR ART Fig. 2
FIG. 2 shows waveshapes illustrating the time base signals used in the scanner of FIG. 1.

The operation of this scanner is ruled by time signals delivered by a non-represented clock. These signals are represented by the waveshapes of FIG. 2. The five signals BV, RZ1, MVRS, *t6* and *t7* are delivered at each scanning step.

Now will be described the scanner operation. It will be assumed that initially the central unit UC has loaded an address AD into register RO, through the link CRO and the OR gate *pc2*, The clock operates and delivers the time signals illustrated by FIG. 2.

The time signal BV enables the AND gate *pc3*, so that the address AD contained in register RO is transmitted on conductors AD towards the selection circuits CS. The address sending thus causes the operation of the selection circuits CS and the interrogation of a group of units in the scanning matrix ME. The data supplied by these units are detected by the read circuits ER and the scanning results are displayed on conductors LS.

At the beginning of signal BV, the time signal RZ1 erases any information stored in register R1. At the end of signal BV, the time signal MVRS enables the gate *pc5* so that the scanning results RE which have had time to stabilize on conductors LS are transmitted to register R1 where they are stored.

The analysis device REV receives the results RE as soon as they are recorded by R1. If these results have certain determined values requiring the intervention of the central unit UC, the device REV delivers a signal EV. It will be first assumed that it is not the case and that signal EV is not supplied. Consequently, the time signal *t6* has no effect.

The time signal *t7* causes the operation of the incrementation circuit IN. The latter, which already receives the address AD supplied by register RO, adds one unit to this address and supplies the incremented address, in response to signal *t7*, towards the gate *pc2*. The incremented address thus takes the place of the initial address in register RO.

The scanning step is terminated. Everything is ready for the next scanning step. The scanning may then progress step by step, until non-represented means stop it.

In case the analysis of the scanning results shows the necessity of calling the central unit UC, the device REV delivers the signal EV, practically since the end of signal MVRS. Therefore, in response to the time signal *t6*, the AND gate *pc9* delivers a stop signal EOJ. This signal, through non-represented means, calls the central unit and locks the clock operation. The clock stops operating before delivering signal *t7*. The address contained in register RO is thus the address which has enabled the scanning results stored in register R1 to be obtained.

The central unit UC answers the call by reading out register RO contents, through the link LR1. It thus receives the address of a group of units and the corresponding scanning results. Then, the central unit releases the scanner by unlocking the clock which resumes its operation from the stop-point. It thus first delivers the impulse *t7*, which controls the incrementation of the address, then a new scanning step is achieved.

Figure 1:
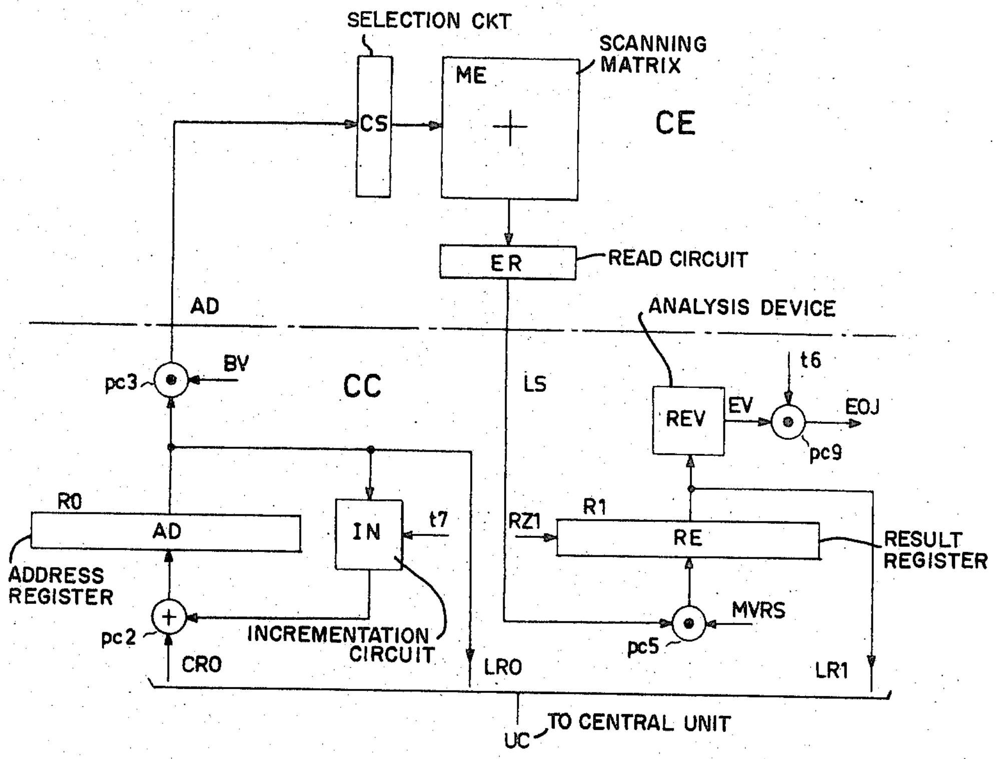
FIG. 1 is a block diagram of circuits of a well-known asynchronous scanner.

A full description of a scanner corresponding to the diagram of FIG. 1 will be found in the Patent application meantioned at the beginning of this text.

As is easy to see, the operation of this asynchronous scanner depends to a great extent upon the good operation of the clock delivering the time signals and upon the scanning counter constituted by register RO and the incrementation circuit IN.

DESCRIPTION OF THE PREFERRED EMBODIMENT

The present invention relates to a checking process and system for a scanner of this type which will now be described referring to the diagram of FIG. 3.

Figure 3:
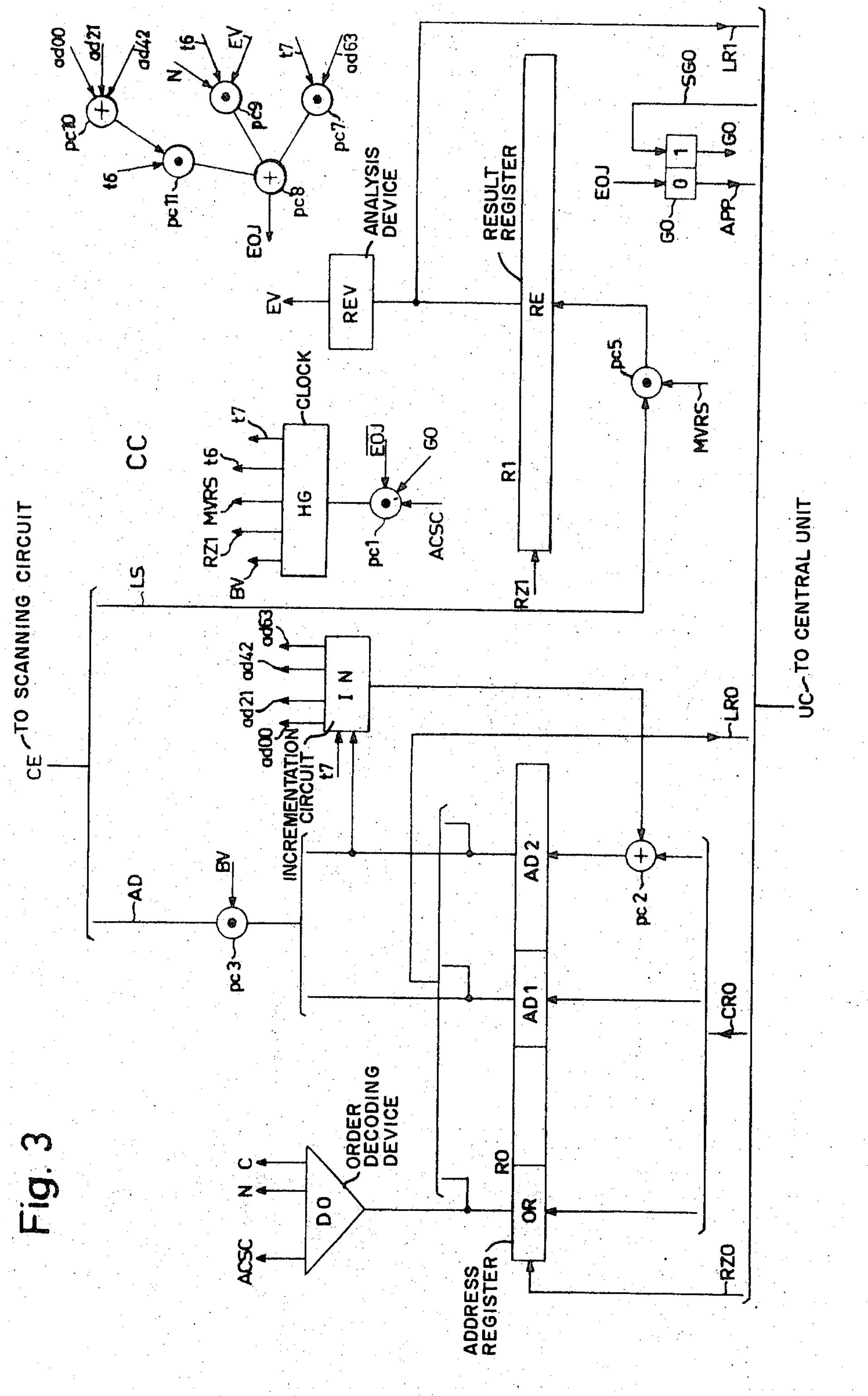
FIG. 3 is a diagram of the circuits of an asynchronous scanner, according to the present invention.

The diagram of FIG. 3 shows control circuits of an asynchronous scanner such as that of FIG. 1. These circuits include means for applying the checking process of the present invention, In the diagram of FIG. 3, are found certain elements of the diagram of FIG. 1 which are referenced the same.

With respect to the circuits of FIG. 1, those of FIG. 3 include in addition:

a complement of register RO provided for recording an order OR which may have several meanings;

an order decoding device DO;

the clock HG and its control circuit;

an on/off bistable GO;

complementary circuits for delivering signal EOj in different cases of operation.

It will be initially assumed that all the circuits are at rest, the scanner being unoperated. Registers RO and R1, in particular, contain no information. Bistable GO is in position O. A condition EOJ (complementary of condition EOJ) is present.

The central unit UC writes an instruction into register RO, through the link CRO. This instruction is a 16-bit data word recorded by 16 bistables constituting register RO. It includes the following parts:

a 3-bit indication OR, provided for specifying the type of instruction to be executed;

a 3-bit constant indication AD1 giving a first part of the address of the units to be scanned;

a 6-bit variable indication AD2 giving a second part of the address of the units to be scanned.

The indications AD1 and AD2 define an address corresponding to a group of eight units interrogated simultaneously in the course of a scanning step. As can be seen in the figure, the incrementation circuit IN is only connected to the six stages of register RO containing the part AD2. Indeed, it is provided that the scanner automatically scans, in response to a scanning instruction, only the $2^6 = 64$ groups of eight units whose addresses have in common a same value of AD1 and are differentiated by the value of AD2.

The scanner thus receives an order specified by OR, as well as an address defining a group of eight units which will be first interrogated. It will then automatically interrogate up to 63 similar groups as will be further seen.

As soon as the instruction is written into register RO, the indication OR specifying the order to be executed is transmitted to the order decoding device DO. The latter, in the scope of the present invention, supplies:

whatever the instruction is, a signal ACSC indicating the presence of an order and used as operating condition;

a signal N, if the central unit UC asks for a scanning;

a signal C, if the central unit asks for a check.

It will be first assumed that the central unit UC has given a scanning instruction and that the decoding device DO delivers the signals N and ACSC.

The central unit UC then gives the starting order by setting bistable GO in position 1, through the link SGO. The latter then delivers the condition GO.

The condition EOJ being present, the signals ACSC and GO, through an AND gate *pc1*, cause the operation of the clock HG. The latter delivers the time signals illustrated by FIG. 2.

As previously described, the sending of address AD (AD1 and AD2), towards the scanning circuits CE is conditioned by the time signal BV. In response, after a certain time corresponding to the duration of signal BV, scanning results comprising two bits per unit interrogated stabilize on conductors LS. Signal RZ1 resets, if necessary, the sixteen bistables constituting register R1. Signal MVRS enables the gate *pc5* and the scanning results RE are written into register R1. The analysis device REV delivers or not signal EV. If signal EV is not supplied, the time signal *t7* causes the incrementation circuit IN and the part AD2 of the address is increased by one unit, then a new scanning steo begins.

On the contrary, if signal EV is supplied and condition N is also present, the time signal *t6* causes the operation of gate *pc9*, which, through an OR gate *pc8*, results in signal EOJ. The complementary signal EOJ delivered up to now by an-inverter (non-represented) disappears, which stops the clock HG since the end of the time signal *t6*, before it has delivered the time signal *t7*.

The condition EOJ resets bistable GO. Accordingly, the latter delivers a signal APP which calls the central unit UC. Moreover, the condition GO disappears, which ensures the stop of the clock HG.

In response to this call, the central unit UC reads out the contents of registers RO and R1, through the links LRO and LR1. It will know the identity of the concerned group of units and the scanning results which have motivated the call. It will then restart the scanner by setting bistable GO in position 1 through the link SGO.

The signal EOJ having disappeared since the end of time signal *t*6, the complementary condition EOJ is present anew, so that, as soon as condition GO is reestablished, the clock resumes its operation from its stop point and delivers first the time signal *t*7, then it undertakes the next scanning step.

In other respects, since a scanning instruction concerns 64 groups of units differentiated by the indication AD2, it is necessary that the central unit be informed that all these units have been scanned.

To this end, the incrementation circuit IN has an outlet *ad*63 which is marked when the indication AD2 has the value 63, that is during the scanning step concerning the last of the 64 groups. At the end of the scanning step, when the time signal *t*7 is delivered by the clock, a gate *pc*7 operates and, through gate pc8, delivers signal EOJ. As just described, the clock stops and bistable GO is reset, which results in calling the central unit UC. The latter will answer the call as previously, by reading out registers RO and R1. The value of the indication AD2 can be sufficient to indicate that the scanning is finished.

As the clock has completely stopped at the end of the cycle, after having delivered the time signal *t*7, it is ready to start again at the beginning of the cycle, upon receiving a new instruction transmitted by the central unit UC.

Now will be described the process used for checking the scanner operation, as well as the means involved.

For checking the scanner operation, which is assumed to be in its initial position as above-described, the central unit UC supplies a check instruction. This check instruction has the above described composition and the indication OR is such that the decoding device DO delivers signals ACSC and C. Consequently, signal N is absent.

Then, the central unit UC sets bistable GO in position 1, which causes the operation of the clock HG (conditions ACSC, GO and EOJ).

Therefore, as in the case of normal scanning, a first scanning step is achieved, in response to the time signals BV, RZ1, MVRS, until the scanning results RE are stored into register R1.

Due to the absence of condition N, at time *t*6, the gate *pc*9 cannot operate, even if the read results ask for calling the central unit UC. The read results thus are not taken into consideration.

At time *t*7, the incrementation circuit operates and increases by one unit the indication AD2. The scanning can thus be normally carried out, but without traffic load.

Moreover, it is provided that the scanner stops systematically on certain predetermined scanning steps and calls the central unit UC which can thus check that the scanning has normally progressed.

To this end, there has been provided that the incrementation circuit identifies these scanning points by delivering signals *ad*00, *ad*21 and *ad*42. The signal *ad*00 is delivered when the indication AD2 has the value 000 000, that is 00 in decimal numbering. The signal *ad*21 corresponds to the value 010 101, that is 21; the signal *ad*42 corresponds to the value 101 010, that is 42.

It will be also advantageously provided that the central unit, when it supplies a check instruction, gives the address indication AD2 the value 00. Consequently, from the first scanning step, the circuit IN delivers the signal *ad*00. This signal, through gate *pc*10 reaches gate *pc*11.

Thus, from the first scanning step, when the time signal *t*6 appears, gate *pc*11 operates and, through gate *pc*8, delivers the signal EOJ. As above-described, the signal EOJ causes the stop of the clock HG and the call of the central unit UC.

The central unit UC answers the call by reading out register RO. It finds the order OR characrerizing a check scanning and the address AD of value 00. This first check both makes it possible to verify the scanner operation, that is that the clock HG operates, and to know the exact time of the beginning of the scanning. Then, without reading out register R1, which will be useless in such a case, the central unit UC sets bistable GO in position 1, in order that the check scanning recommences.

The scanning recommences according to the above-described conditions and progresses, without taking into consideration the scanning results until the indication AD2 reaches the value 21. At that time, the circuit IN delivers the indication *ad*21. A new stop occurs, the signal EOJ being delivered by the gates *pc*10, *pc*11 and *pc*8 as in the case of signal *ad*00.

The central unit reads out anew register RO and finds in it besides the order OR corresponding to a check scanning, an indication AD2 of value 21. It can thus check that the counter has progressed up to that position wherein half of the counter stages are now in position 1 (AD2 = 010 101).

The scanning recommences as soon as the central unit UC unlocks the scanner (by setting bistable GO in position 1) and another stop takes place, in the same conditions when the indication AD2 reaches the value 42, the circuit IN delivering the signal *ad*42. This stop is processed by the central unit UC like the preceding ones. It can check that the counter has progressed up to the position 42 wherein the other half of the counter stages are in position 1 (AD2 = 101 010).

Finally, the check scanning will end when the circuit IN delivers the signal *ad*63 as in the case of a normal scanning, which will result in a stop further to the time signal *t*7 (gate *pc*7) indicating to the central unit that the check is terminated.

The check scanning has thus permitted the central unit to check that the scanning counter has successively reached the positions 000 000, 010 101, 101 010 and 111 111. The check steps are chosen in order to give information on the operation of all the counter stages. Indeed:

the step 000 000 is reached if the scanner control circuits and, in particular, the clock have operated, whereas all the counter stages are in position 0;

the step 010 101 is reached if the odd stages come to position 1 and if the even stages except the last one, after having been in position 1 have returned to position 0;

the step 101 010 is reached if the even stages return to position 0;

the last step 111 111 confirms the preceding indications.

Obviously, the steps could be differently chosen and nevertheless all the counter stages checked. The chosen example offers the advantage of comprising only two intermediate steps which are equidistant. The central unit can then allot the same time to the scanner progression from one step to the next one, which must be reached before the allotted time expires, according to a well-known operation checking process.

What is claimed is:

1. A checking system for a scanner comprising register means for receiving and recording instruction signals and address signals from a central unit, order decoding means coupled to said register means responsive to instruction signals recorded in said register means to provide operate signals, first logic means responsive to a start order from a central unit to turn "on" and provide a GO signal, a clock coupled responsive to said GO signal to provide a plurality of time signals, gate means coupled to said register means to transmit address signals in synchronism with time signals from the clock, second logic means coupled to said register means to provide stop signals identify points to be tested in response to the address signals and to time signals from the clock, and third logic means responsive to the stop signals and to time signals to provide scan stop signals for stopping the system.

2. The invention as claimed in claim 1, in which the register means includes a first portion to receive instruction signals and second and third portions to receive address signals, and said gate means is coupled to said second and third portions of the register.

3. The invention as claimed in claim 2, in which said second logic means is coupled to said third portion of the register to respond to address signals stored therein.

4. The invention as claimed in claim 1, in which the third logic means includes a plurality of gates adapted to respond to time signals from said clock and stop signals from said second logic means to provide scan stop signals.

5. The invention as claimed in claim 4, in which the first logic means includes a connection to receive scan stop signals causing said first logic means to turn "off" and provide a signal indicating the "off" status.

* * * * *